(12) United States Patent
Lamy et al.

(10) Patent No.: US 9,230,923 B2
(45) Date of Patent: Jan. 5, 2016

(54) ELECTRONIC CHIP WITH MEANS OF PROTECTING ITS BACK FACE

(71) Applicant: COMMISSARIAT A L'ENERGIE ATOMIQUE ET AUX ENE ALT, Paris (FR)

(72) Inventors: Yann Lamy, Saint Etienne de Crossey (FR); Alain Merle, Quaix en Chartreuse (FR); Guy-Michel Parat, Claix (FR); Assia Tria, Auriol (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/510,525

(22) Filed: Oct. 9, 2014

(65) Prior Publication Data

US 2015/0108606 A1 Apr. 23, 2015

(30) Foreign Application Priority Data

Oct. 22, 2013 (FR) ...................................... 13 60292

(51) Int. Cl.
*H01L 23/00* (2006.01)
*H01L 49/02* (2006.01)
(Continued)

(52) U.S. Cl.
CPC .............. *H01L 23/573* (2013.01); *G06F 21/86* (2013.01); *H01L 21/76816* (2013.01);
(Continued)

(58) Field of Classification Search
CPC ........... H01L 23/3672; H01L 23/3735; H01L 27/0805; H01L 28/40; H01L 23/573; H01L 27/0694; H01L 27/02203; H01L 29/945; H01L 29/66181; H01L 23/576; H01L 21/76816; H01L 2924/19042; H01L 23/5227; H01L 2924/30105; H01L 23/5223; H01L 2924/19041; H01L 2924/30107; H01L 2224/06515; G06F 21/86

See application file for complete search history.

(56) References Cited

U.S. PATENT DOCUMENTS 6,236,103 B1 * 5/2001 Bernstein et al. ............. 257/532
2007/0121575 A1 5/2007 Savry et al.
(Continued)

FOREIGN PATENT DOCUMENTS

EP 2 535 932 A1 12/2012
FR 2 875 927 A1 3/2006

OTHER PUBLICATIONS

French Preliminary Search Report issued Jul. 9, 2014, in French Application No. 13 60292 filed Oct. 22, 2013 (with English Translation of Categories of Cited Documents).

*Primary Examiner* — Ermias Woldegeorgis
(74) *Attorney, Agent, or Firm* — Oblon, McClelland, Maier & Neustadt, L.L.P.

(57) ABSTRACT

An electronic chip is provided, including an electronic circuit located at a front face of a substrate; a capacitive element placed at a back face of the substrate and facing the electronic circuit, and electrically connected to the electronic circuit by a first electrical connection and a second electrical connection, the first electrical connection including at least a first electrically conducting via passing through the substrate, the electronic circuit being configured to measure a value of electrical capacitance of the capacitive element between the first and the second electrical connections; and a plurality of second vias or trenches passing through the back face of the substrate and a part of the thickness of the substrate, and extending toward the electronic circuit such that bottom walls of the plurality of second vias or trenches are separated from the electronic circuit by at least one non-zero distance.

17 Claims, 3 Drawing Sheets

(51) Int. Cl.
*H01L 21/768* (2006.01)
*G06F 21/86* (2013.01)
*H01L 29/66* (2006.01)
*H01L 29/94* (2006.01)
*H01L 27/02* (2006.01)
*H01L 27/06* (2006.01)
*H01L 23/522* (2006.01)

(52) U.S. Cl.
CPC ......... *H01L 23/576* (2013.01); *H01L 27/0203* (2013.01); *H01L 27/0694* (2013.01); *H01L 28/40* (2013.01); *H01L 29/66181* (2013.01); *H01L 29/945* (2013.01); *H01L 23/5223* (2013.01); *H01L 23/5227* (2013.01); *H01L 2224/06515* (2013.01); *H01L 2924/19041* (2013.01); *H01L 2924/19042* (2013.01); *H01L 2924/19104* (2013.01); *H01L 2924/30105* (2013.01); *H01L 2924/30107* (2013.01)

(56) References Cited

U.S. PATENT DOCUMENTS

| | | |
|---|---|---|
| 2008/0010690 A1 | 1/2008 | Delapierre |
| 2010/0026313 A1 | 2/2010 | Bartley et al. |
| 2010/0026506 A1 | 2/2010 | Bartley et al. |
| 2010/0187525 A1 | 7/2010 | Bartley et al. |
| 2013/0161828 A1 | 6/2013 | Lamy |
| 2013/0293428 A1 | 11/2013 | Souriau et al. |

\* cited by examiner

ELECTRONIC CHIP WITH MEANS OF PROTECTING ITS BACK FACE

TECHNICAL FIELD AND PRIOR ART

This application relates to the field of security and protection of electronic chips and relates to means of preventing access to data stored in the electronic circuit of an electronic chip from its back face. The invention is applicable to all types of electronic chips including mobile telephony chip, bank card, health card, etc.

The purpose of attacks that might be applied to an electronic chip is to access confidential data stored in the electronic chip in order to clone it, modify stored information, usurp its owner's identity, etc. Electronic chips may be attacked in many ways including through the use of chemical, physical, laser, electromagnetic, electrical means, etc.

These attacks are usually applied by aiming at two objectives. The first is to acquire or retrieve internal information manipulated by the electronic circuit in the chip (observation of electrical consumption of the circuit, electromagnetic radiation generated by the circuit, circuit probing, in other words physically accessing the circuit by setting up an electrical connection with a track internal to the circuit, contactless probing of an internal track, etc.) The second consists of injecting faults (changing the state of a bit or a group of bits by injection of light, laser, electromagnetic radiation, etc.) during a calculation performed by the electronic circuit of the chip. A combination of these different techniques is very frequently used.

There are several types of protection for guarding against such attacks. The first protection level is physical hardware protection of the chips. For example, the front face of an electronic chip (the face on which the electronic chip circuit is located) may be protected by adding special protection layers on this front face. These protection layers have physical and/or electrical properties that change when external attacks are made on the electronic chip, so that the chip can detect an attack and if required, can put itself in fault.

The basic idea of front face protection of an electronic chip is to implant an active metal screen on the top face of the electronic circuit of the chip and to check its integrity. Such a screen was initially developed to prevent physical probing (setting up an electrical connection with one of the subjacent tracks on the front face of the chip), but it is also efficient for preventing contactless interactions with the electronic circuit of the chip (fault injections through a laser or electromagnetic radiation, contactless probing, observation of the electromagnetic radiation of the electronic circuit, etc.). To be efficient, a mechanism for checking the integrity of the screen is necessary, in other words capable of detecting even a very minor alteration in the screen (broken track, change in track length, etc.).

The real weakness in the security of electronic chips is on their back face. With current etching and thinning techniques, it is possible to approach very close to the back face of the chip electronic circuit and to retrieve stored information or to inject faults.

Therefore, the back faces of electronic chips have to be protected to prevent any intrusion.

In the same way as for the front face, the usefulness of a screen placed on the back face of the electronic chip is based on the capacity to check its integrity, making connections necessary between the logic implemented in the electronic circuit and this screen. It is relatively easy to use physico-chemical manipulations or focussed ion beams (FIB), either to remove this protection screen for example by thinning the circuit, or to modify it (for example by forming a hole in the screen to obtain access to the back face of the chip). Therefore, it is essential to have a screen integrity check mechanism.

On-off type mechanisms, in other words mechanisms that verify the presence of the screen, can easily be attacked, for example by making an FIB connection, such that the screen always appears to be present to the electronic circuit.

Document US 2007/121575 A1 discloses an electric chip designed to contain or to process data to be protected in a secure manner. The front face of the chip comprises an inductance that, by inductive coupling through the chip substrate, detects the presence of a conducting ground plane located on the back face of the chip. Alteration by attacking this conducting ground plane induces a variation in the inductive coupling between the front and back faces of the chip, which leads to a chip fault.

However, this solution gives a limited degree of protection because such protection of the back face of the chip is fairly simple and easy to copy (metallic conducting ground plane). Furthermore, inductive patterns are usually fairly large and voluminous, so that it is impossible to obtain local protection of data. Furthermore, inductive coupling is very weak if the substrate of the electronic chip maintains a certain thickness. Finally, the conducting ground plane on the back face is completely disconnected from the inductance on the front face, which is potentially a weak point for security of the electronic chip.

PRESENTATION OF THE INVENTION

Thus there is a need to disclose an electronic chip for which the back face is efficiently protected against different types of attacks, regardless of the thickness of the substrate of the electronic chip and in which a reliable check of the integrity of the back face of the electronic chip can be made.

To achieve this, one embodiment discloses an electronic chip comprising at least:

- an electronic circuit located at a front face of a substrate;
- at least one capacitive element placed at least at a back face of the substrate and at least partly facing the electronic circuit, and electrically connected to the electronic circuit by at least one first and one second electrical connection, the first electrical connection including at least one first electrically conducting via passing through the substrate, the electronic circuit being capable of measuring the value of the electrical capacitance of the capacitive element between the first and the second electrical connections, and/or
- at least one second via or a trench passing through the back face of the substrate and a part of the thickness of the substrate, and facing the electronic circuit such that a bottom wall of the second via or of the trench are separated from the electronic circuit by a non-zero distance.

In this description, a capacitive element refers to an element forming a non-zero electrical capacitance at the back face of the substrate and possibly in part of the thickness of the substrate.

Therefore, such an electronic chip comprises an efficiently protected back face due to the capacitive element present at the back face of the substrate and the value of which can be checked to assure that the back face maintains its integrity. Therefore such a capacitive element provides efficient protection of the back face of the electronic chip, for example against thinning of the back face of the chip because such thinning would modify the value of the electrical capacitance of the capacitive element, that could be detected for example by a check on this value made by the electronic circuit on the chip. The fact that the substrate of the electronic chip cannot be thinned significantly complicates procedures for recovery of data stored on the chip, including physical (for example electrical) and electromagnetic procedures. In particular, the electronic circuit may be put out of service immediately when a physical attack is detected on the back face of the electronic chip (for example if the value of the capacitance of the capacitive element is changed).

The capacitive element present at the back face of the electronic chip also forms a good protection means against attacks involving electromagnetic radiation, since this capacitive element forms a screen against such radiation.

Furthermore, in this case the first electrical connection between the capacitive element and the electronic circuit is formed by a physical connection made particularly by the first electrically conducting via, thus improving the security of the integrity check of the back face of the chip, because it is much more difficult to interact with such a physical electrical connection than with an inductive coupling connection.

In addition to or instead of the capacitive element present on the back face of the electronic chip, the second via(s) or the trench(es) passing through the back face of the substrate and part of the thickness of the substrate facing the electronic circuit, protect the back face of the electronic chip from chemical attacks because such an attack would destroy the electronic circuit of the chip due to the proximity of the bottom of the second via(s) or trench(es) to the electronic circuit. In this case this or these vias or this or these trenches form passive protection means against chemical attacks of the back face of the electronic chip.

Furthermore, when several second vias or trenches are made through the back face of the electronic chip, these elements may in this case provide efficient protection against attacks by laser beams.

Such means of protection of the back face of the electronic chip also have good stability in time and are independent of environmental conditions.

The second electrical connection may comprise at least one third electrically conducting via passing through the substrate or it may comprise at least part of the substrate that is electrically conducting or semiconducting.

The distance between the bottom wall of the second via or the trench and the electronic circuit may be less than or equal to about 20 µm, or less than or equal to 20 µm. Such proximity between the bottom wall of the second via or the trench and the electronic circuit can improve the protection of the back face of the electronic chip against chemical attacks of the back face of the substrate of the chip because in this case, the electronic circuit is quickly destroyed by the chemical agents used to attack the back face of the electronic chip.

The electronic chip may comprise at least:
a first dielectric layer covering the side walls of the first electrically conducting via, the side walls and the bottom wall of the second via or the trench, and the back face of the substrate,
a first continuous electrically conducting layer covering the first dielectric layer on the side walls of the first electrically conducting via, the side walls and bottom wall of the second via or trench, and at least part of the back face of the substrate, and also covering a bottom wall of the first electrically conducting via,
the first electrically conducting layer possibly forming a first electrode of the capacitive element and being electrically connected to the electronic circuit through the first electrical connection.

Such a configuration can result in a capacitive element for which the value can be checked with good sensitivity. Furthermore, the presence of an electrically conducting material such as a metal in the second via(s) or trench(es) then forms a screen against electromagnetic radiation.

Part of the substrate placed in contact with the first dielectric layer and facing the first electrically conducting layer may form a second electrode of the capacitive element.

The first dielectric layer and the first electrically conducting layer may completely fill the volumes formed by the first and/or the second electrically conducting via or the trench. The protection of the back face of the chip is improved in this configuration, particularly when the first dielectric layer and the first electrically conducting layer completely fill the volume formed by the second via(s) or the trench(es).

The electronic chip may also comprise a second structured electrically conducting layer at the front face of the substrate, forming a coil inductively coupled to at least part of the first electrically conducting layer, and the second electrically conducting layer may be electrically connected to the electronic circuit that can measure the value of an inductance of the coil. With such a configuration, an additional check on the integrity of the back face of the electrical chip can be made by checking the inductance of the coil, independently of the check on the value of the electrical capacitance of the capacitive element.

In this case, said part of the first electrically conducting layer may correspond to the part located at the bottom wall of the second via or the trench.

The first electrically conducting layer may comprise a material which is not transparent to wavelengths between about 100 nm and 10 µm, in other words from the infrared to the ultraviolet. In this case, the first electrically conducting layer can be used to reflect, diffract or diffuse light radiation such as laser beams that reach the back face of the electronic chip.

The capacitive element may comprise at least:
a first plane electrically conducting portion located at the back face of the substrate, possibly forming a first electrode of the capacitive element and being electrically connected to the electronic circuit;
a second dielectric layer covering at least the first plane electrically conducting portion;
a second plane electrically conducting portion separated from the first plane electrically conducting portion by the second dielectric layer, forming a second electrode of the capacitive element and being electrically connected to the first electrically conducting via.

In this case, the electronic chip may comprise at least one third plane electrically conducting portion separated from the first plane electrically conducting portion by the second dielectric layer and electrically connected to the electronic circuit through at least the third electrically conducting via passing through the substrate, and the first plane electrically conducting portion and the third plane electrically conducting portion may form a first electrode and a second electrode respectively of a second capacitive element located at the back face of the substrate and at least partly facing the electronic circuit.

In this case, the capacitive element is formed by at least two plane capacitances formed at the back face of the substrate.

As a variant, the first plane electrically conducting portion may be in contact with an electrically conducting material that fills at least the second via or the trench and may be electrically connected to the electronic circuit through at least the third electrically conducting via passing through the substrate.

As a variant, the first plane electrically conducting portion may be electrically connected to the electronic circuit through at least a part of the substrate which is electrically conducting or semiconducting.

The electronic chip may comprise several second vias or trenches passing through the back face of the substrate and part of the thickness of the substrate and having different dimensions. With this configuration, a capacitive element can be obtained for which the value of the electrical capacitance is variable depending on the dimensions of the second vias or trenches, and which is therefore difficult to reproduce.

The thickness of the substrate may be between about 200 µm and 700 µm, which makes it more difficult to attack the front face of the electronic chip from its back face.

Another embodiment relates to a method of manufacturing an electronic chip comprising at least the following steps:
- formation of an electronic circuit at a front face of a substrate;
- fabrication of at least one capacitive element at at least one back face of the substrate and at least partly facing the electronic circuit, and at least one first electrical connection and one second electrical connection such that the first electrical connection comprises at least one first electrically conducting via passing through the substrate and electrically connecting the capacitive element to the electronic circuit, the electronic circuit being capable of measuring the value of the electrical capacitance of the capacitive element between the first and the second electrical connections and/or,
- fabrication of at least one second via or trench passing through the back face of the substrate and part of the thickness of the substrate, and located facing the electronic circuit such that a bottom wall of the second via or the trench is at a non zero distance from the electronic circuit.

The electronic circuit may be made directly on the substrate or it may be transferred onto the substrate.

The method may include the fabrication of several second vias or trenches passing through the back face of the substrate and part of the thickness of the substrate, the dimensions of each of the second vias or trenches being chosen randomly relative to the dimensions of the other second vias or trenches. This thus makes it even more difficult to reproduce the capacitive element in comparison with a capacitive element for which the electrical capacitance has a predefined value. In this case, the value of the capacitance of the capacitive element can be measured for example the first time that the electronic chip is powered up and it may be verified subsequently each time that the chip is activated.

The method may include the fabrication of at least one third electrically conducting via passing through the substrate and that will form at least part of the second electrical connection.

BRIEF DESCRIPTION OF THE DRAWINGS

This invention will be better understood after reading the description of example embodiments given purely for information and that are in no way limitative with reference to the appended drawings in which.

Identical, similar or equivalent parts of the different figures described below have the same numeric references so as to facilitate comparison between the different figures.

The different parts shown in the figures are not necessarily all at the same scale, to make the figures more easily readable.

The different possibilities (variants and embodiments) shall be understood as not being mutually exclusive and they can be combined with each other.

DETAILED PRESENTATION OF PARTICULAR EMBODIMENTS

Figure 1:
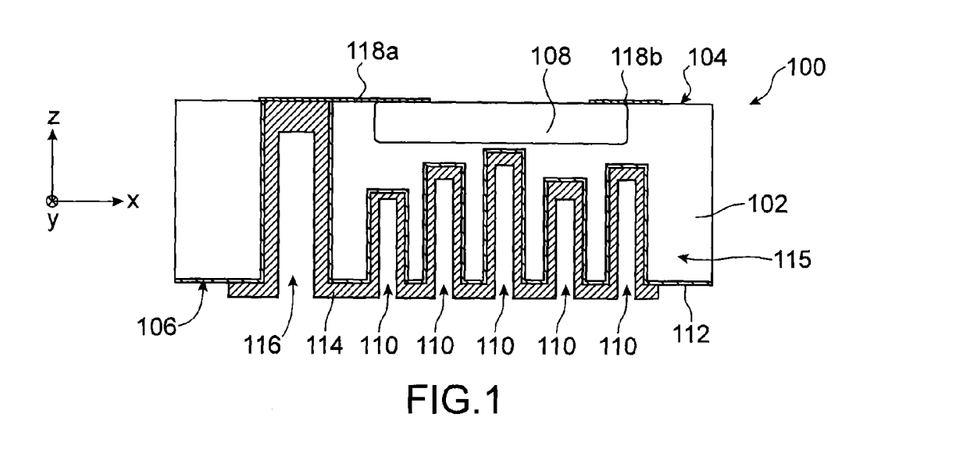
FIG. 1 shows an electronic chip according to a first embodiment.

Refer firstly to FIG. 1 that shows an electronic chip 100 according to a first embodiment, the back face of which comprises means of protecting from attacks against this chip.

The electronic chip 100 comprises a substrate 102, for example comprising an electrically conducting or semiconducting material such as silicon, with a thickness of more than about 120 µm, and preferably between about 200 µm and 700 µm. The substrate 102 comprises a first main face called the front face 104 and a second main face called the back face 106 opposite the front face 104. The front face 104 and the back face 106 of the substrate 102 are considered as being the front and back faces of the electronic chip 100. The electronic chip 100 also comprises an electronic circuit 108, particularly including CMOS transistors made at the front face 104 of the substrate 102 and in which data to be protected are stored.

The electronic chip 100 also comprises means protecting the back face of the electronic chip 100 and particularly the electronic circuit 108 from the back face 106. In this first embodiment, these means comprise several non-through vias 110 made from the back face 106 of the substrate 102 through part of the thickness of the substrate 102 facing the electronic circuit 108.

The vias 110 have depths (dimensions along the Z axis) and dimensions in a plane parallel to the main faces 104 and 106 of the substrate 102 ((X,Y) plane), corresponding to the diameters in the case of vias 110 with approximately circular sections, different from each other, and for example chosen at random during their fabrication. The depths of the vias 100 are related to the diameters of the vias 110 and are chosen particularly as a function of the thickness of the substrate 102 and the depth reached by the electronic circuit 108 in the substrate 102.

The side walls and the bottom walls of the vias 110 are covered with a dielectric layer 112, for example comprising an oxide such as $SiO_2$ that also covers the back face 106 of the substrate 102. An electrically conducting layer 114, for example corresponding to a metallic layer that can be made with copper and/or tungsten, continuously covers the dielectric layer 112 at the side walls and bottom walls of the vias 110, and at part of the back face 106 of the substrate 102, particularly between the vias 110.

Thus, the electrically conducting layer 114, the dielectric layer 112 and part of the substrate 102 that is separated from the electrically conducting layer 114 by the dielectric layer 112 together form a capacitive element 115, for which the value of the electrical capacitance depends particularly on the dimensions of vias 110 (depths and diameters). Since the dimensions of the vias 110 are chosen at random, the value of this electrical capacitance is also random. The electrically conducting layer 114 forms the first electrode of this capacitive element 115. The part of the substrate 102 in contact with the dielectric layer 112 and located facing the electrically conducting layer 114 forms the second electrode of this capacitive element 115. These two electrodes are electrically insulated from each other by the dielectric layer 112 thus forming a capacitive element.

A through via 116 is made through the entire thickness of the substrate 102 adjacent to the electronic circuit 108. The dielectric layer 112 and the electrically conducting layer 114 cover the side walls of the via 116, and the electrically conducting layer 114 is prolonged at the bottom wall of the via 116 (unlike the dielectric layer 112 that only covers the side walls of the via 116 and not the bottom wall of the via 116), thus providing an electrical access from the front face 104 of the substrate 102 to the first electrode of the capacitive element 115 present on the back face of the electronic chip 100. A first electrically conducting element 118a formed on the front face 104 of the substrate 102 electrically connects the conducting via 116 to the electronic circuit 108. A second electrically conducting element 118b is also formed on the front face 104 of the substrate 102 and electrically connects the substrate 102 to the electronic circuit 108. Thus, the first electrically conducting element 118a and the via 116 form a first electrical connection between the first electrode of the capacitive element 115 and the electronic circuit 108. Furthermore, the second electrically conducting element 118b and the substrate 102 (since the substrate comprises a conducting or semiconducting material capable of transferring an electrical potential from the back face 106 of the substrate 102 to the front face 104) form a second electrical connection between the second electrode of the capacitive element 115 (formed by the part of the substrate 102 located in contact with the dielectric layer 112 and facing the electrically conducting layer 114) to the electronic circuit 108. Therefore the value of the electrical capacitance of the capacitive element 115 can be measured by the electronic circuit 108 by means of these two electrical connections by which the electronic circuit 108 can measure the voltage or the potentials difference between the two electrodes of the capacitive element 115.

The protection means disclosed above can protect the electronic chip 100 against several types of attacks.

Firstly, they provide protection against thinning (for example mechanical-chemical planarisation) of the back face of the electronic chip 100. Such thinning would eliminate the parts of the electrically conducting layer 114 located on the back face 106 of the substrate 102, thus causing a break of the electrical contact between the parts of the electrically conducting layer 114 located in the vias 110 and the conducting via 116, and therefore between the capacitive element 115 on the back face of the electronic chip 100 and the electronic circuit 108. Therefore a measurement of the value of the electrical capacitance of the capacitive element 115 by the electronic circuit 108 and a comparison between the measured value and a reference value (for example corresponding to a measurement of this capacitance the first time that the electronic chip 100 is used) can detect if the back face of the electronic chip has been thinned. Furthermore, the random nature of the value of this electrical capacitance formed at the back face of the electronic chip 100 when the dimensions of the vias 110 are chosen randomly also contributes to this protection because it is then impossible to simulate the presence of this capacitance if it has been destroyed, because its value is unknown.

These means also provide protection against laser and/or electromagnetic attacks because the matrix of vias 110, the walls of which are covered by the electrically conducting layer 114 that is advantageously made from a non-transparent metal, can be used to reflect, diffract or diffuse light beams, for example laser beams or electromagnetic radiation.

When the electronic chip 100 is to be protected from such laser attacks, the dimensions of the vias 110 are advantageously less than the wavelength of the laser light beams that would be blocked.

The presence of vias 110 at the back face of the electronic chip 100 also protects the electronic chip 100 against chemical attacks. Unlike the back face 106 of the substrate 102, the bottom walls of the vias 110 are close to the electronic circuit 108, for example such that the distance separating the electronic circuit 108 from the bottom wall(s) of one or several vias 110 is less than or equal to about 20 µm, or for example between about 10 and 20 µm. Thus a chemical attack, for example using a solution of hydrofluoric acid and nitric acid or potassium hydroxide, intended to etch the substrate 102 from its back face 106, will prematurely destroy the electronic circuit 108 through the back face due to the chemical solution(s) that will attack the bottom walls of the vias 110 and quickly reach the electronic circuit 108.

The layers or materials deposited in the vias 110 may be thin enough such that the protection of the electronic chip 100 is not altered in view of chemical attacks. Thus the dielectric layer 112 has for example a thickness between about 200 nm and 500 nm and the electrically conductive layer 114 has for example a thickness between about 200 nm and 2000 nm. In addition, given the depositions carried out for making these layers, which are for example PVD or PECVD, the deeper the vias are, the thinnest the deposited layers are, and thus the closest to the component the layers are. The thickness of the materials arranged in the vias 110 may be unimportant compared to the aggressiveness of the chemical attacks (acid, basic, etc.). The vias 110 may be partially filled by these layers or materials. During a chemical attack, the materials arranged in the vias 110 may be consumed faster than the material of the substrate 102.

Figure 2A:
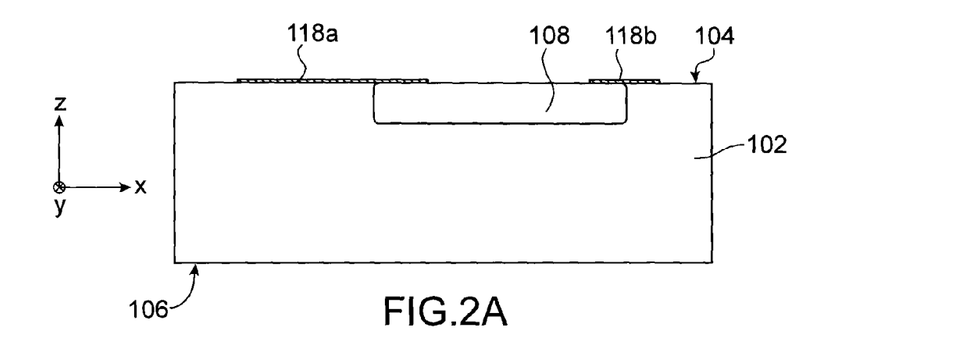
FIGS. 2A to 2C show the steps in a method of making the electronic chip according to the first embodiment.
Figure 2B:
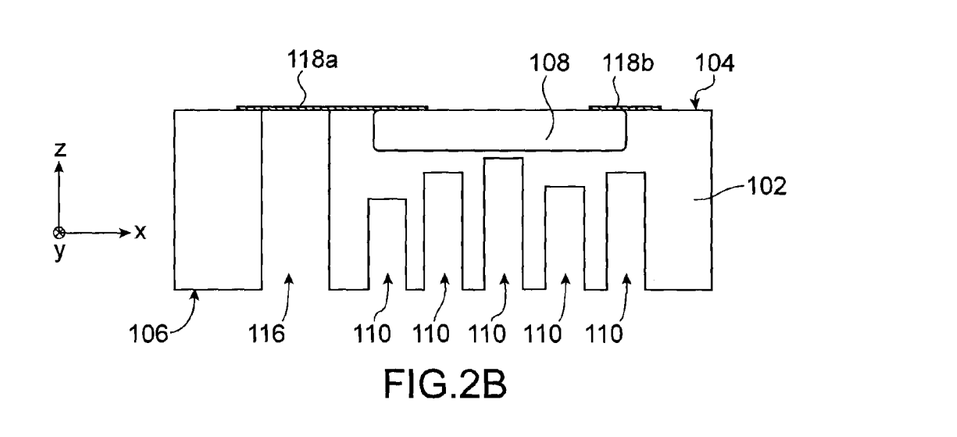
Figure 2C:
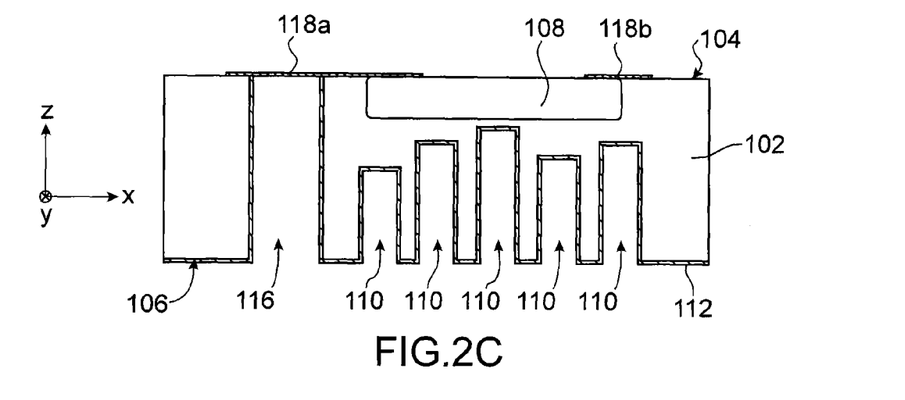

We will now describe steps in a method for fabrication of the electronic chip 100 described above with reference to FIG. 1, with reference to FIGS. 2A to 2C. Although this method is described as being used to make a single electronic chip 100, this method can advantageously be used to make several electronic chips collectively directly from a single wafer or substrate.

As shown in FIG. 2A, the electronic circuit 108 and the electrically conducting elements 118a, 118b are made at the front face 104 of the substrate 102. The substrate 102 may be thinned from its back face 106 if the initial thickness of the substrate 102 is greater than required.

The vias 110 and the via 116 are then defined by lithography and are etched, for example by the use of deep reactive ionic etching (DRIE), as shown in FIG. 2B.

Since the etching depth of each via is dependent on the diameter of the etched via, it is possible to define a matrix of vias 110 through the back face 106 of the substrate 102, with random dimensions and thus obtain vias 110 with different depths. However, the dimensions of the vias 110 are chosen such that these vias 110 facing the electronic circuit 108 do not reach the electronic circuit 108 through the substrate 102. In particular, large vias 110 for which the bottom walls are very close to the electronic circuit 108, and therefore provide very efficient protection against chemical attacks from the back face of the electronic chip 100, can be combined with smaller vias that provide efficient protection against laser beam attacks.

As shown in FIG. 2C, the dielectric layer 112 is then formed on the side walls of the vias 110 and the via 116, on the bottom walls of the vias 110 and on the non-etched parts of the back face 106 of the substrate 102. For example, this dielectric layer 112 is obtained by the use of an oxide or silicon nitride deposit (for example of the PECVD type) on parts of the substrate 102 forming the walls of the vias 110 and 116 and the back face 106 of the substrate 102. The part of the dielectric layer 112 at the bottom of the via 116 is etched, for example with or without lithography, so that the part of the electrically conducting layer 114 that will subsequently be formed in the via 116 can be electrically in contact with the first electrically conducting element 118a.

The method is completed by forming the electrically conducting layer 114 at the back face of the electronic chip 100 so as to cover the dielectric layer 112 at the walls of the vias 110 and 116, part of the non-etched portions of the back face 106 of the substrate 102, and also covering the bottom wall of the via 116 to be electrically in contact with the first electrically conducting element 118a. For example, the electrically conducting layer 114 may be made by deposition and then etching. The electronic chip 100 disclosed above with reference to FIG. 1 is thus obtained.

Several configurations of the protection means may be envisaged depending on the types of attack against which the electronic chip 100 is designed to be protected. For example, in the case in which the electronic chip 100 is intended to be only protected against chemical attacks, one or several vias 110 may be made at the back face 106 of the substrate 102 facing the electronic circuit 108, without needing to fill this or these vias 110 with the electrically conducting layer 114 nor to make an electrical connection with the electronic circuit 108. If the electronic chip 100 is also designed to be protected against laser attacks and/or electromagnetic type attacks, the protection means in this case may correspond to vias 110 made on the back face 106 of the substrate 102 facing the electronic circuit 108, the walls of which are covered with the dielectric layer 112 and the electrically conducting layer 114, but without the need for any electrical connection with the electronic circuit 108 because these layers form a screen against received radiation.

Figure 3:
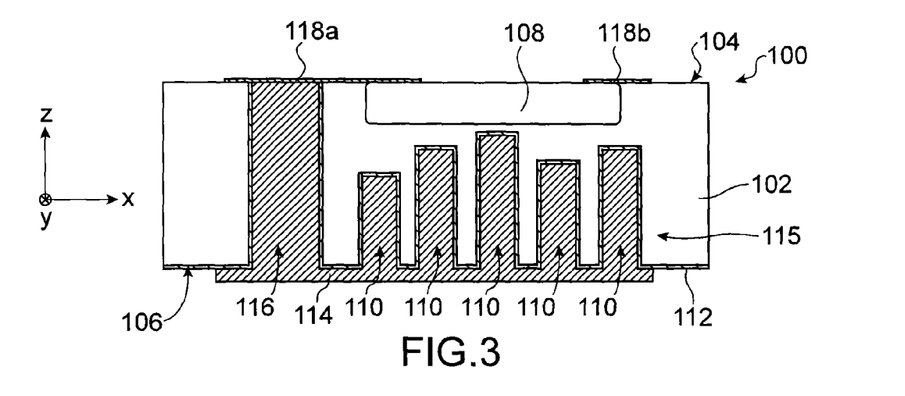
FIG. 3 shows an electronic chip according to a variant of the first embodiment.

In the first embodiment disclosed above, the thickness of the electrically conducting layer 114 is such that the vias 110 and 116 are not completely closed off. As a variant to the first embodiment disclosed above with reference to FIG. 1, it is possible that the thickness of the electrically conducting layer 114 is such that it entirely fills the vias 110 and 116 as shown in FIG. 3. In particular, this variant can increase the strength of the electronic chip 100 while it is being manipulated.

Figure 4:
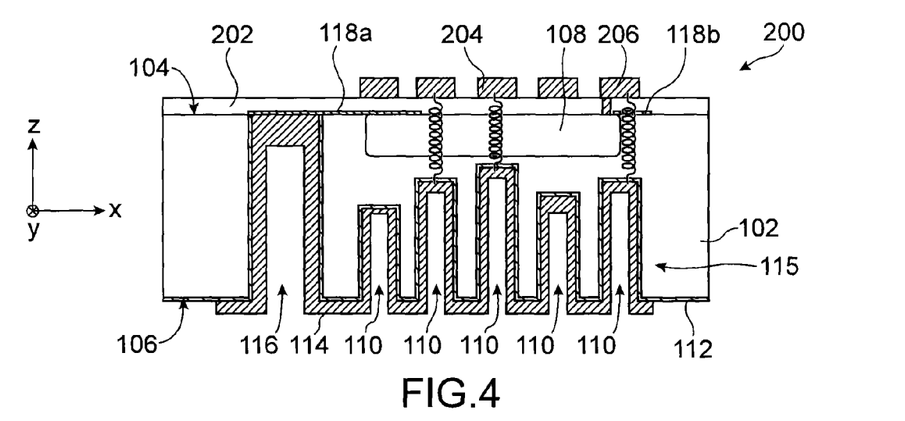
FIG. 4 shows an electronic chip according to a second embodiment.

FIG. 4 shows an electronic chip 200 according to a second embodiment.

Like the electronic chip 100 disclosed above, the electronic chip 200 comprises the substrate 102, the electronic circuit 108, the vias 110 the walls of which are covered by the dielectric layer 112 and the electrically conducting layer 114, the conducting via 116 and the electrically conducting elements 118a and 118b. The electronic chip 200 also comprises another dielectric layer 202 on the front face 104 of the substrate 102, on which another structured electrically conducting layer 204 is made, for example corresponding to a metallic layer forming a coil that can create inductive coupling with the parts of the electrically conducting layer 114 located in the deepest vias 110. In FIG. 4, this coupling is shown symbolically by inductances between the other structured electrically conducting layer 204 and the parts of the electrically conducting layer 114 located in the bottom of the vias 110. Such inductive coupling occurs particularly when the distance between the parts of the electrically conducting layer 114 located at the bottom of the vias 110 and the other structured electrically conducting layer 204 is less than or equal to about the coil diameter. Therefore, given the random nature of the depth of vias 110 made, the inductive coupling obtained is localised and random. Therefore this second embodiment enables an integrity check of the back face of the electronic chip 200 not only due to the check of the electrical capacitance of the capacitive element 115 formed at the back face of the chip 200 but also by checking the value of the inductive coupling between the coil formed by the other structured electrically conducting layer 204 and the vias 110, this measurement being made by the electronic circuit 108 (the other structured electrically conducting layer 204 is electrically connected to the electronic circuit 108 by at least one electrical connecting element 206 passing through the dielectric layer 202).

Figure 5:
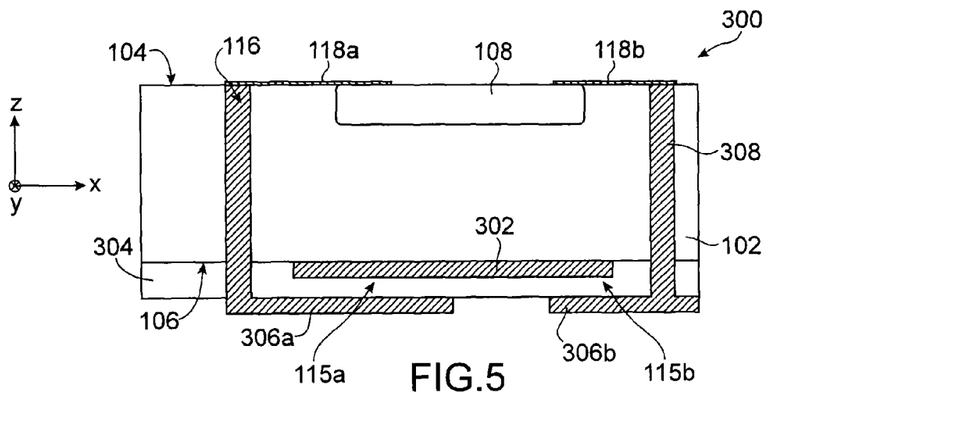
FIG. 5 shows an electronic chip according to a third embodiment.

FIG. 5 shows an electronic chip 300 according to a third embodiment.

Like the electronic chips 100 and 200 disclosed above, the electronic chip 300 comprises the substrate 102, the electronic circuit 108, the conducting via 116 and the electrically conducting elements 118a and 118b. However, in this electronic chip 300, the protection means of the back face of the chip are different from the protection means of the electronic chips 100 and 200. In this third embodiment, the back face 106 of the substrate 102 facing the electronic circuit 108 is covered by a first plane electrically conducting portion 302, in this case corresponding to a plane metallic portion. The first plane electrically conducting portion 302 is electrically connected to the electronic circuit 108 through the substrate 102 (because this substrate comprises a conducting or semiconducting material that transfers an electrical potential from the back face of the substrate 102 as far as the electronic circuit 108). The first plane electrically conducting portion 302 is covered by another dielectric layer 304, for example comprising a material stable at high temperature such as $SiO_2$. On the example in FIG. 5, this dielectric layer 304 also covers the parts of the back face 106 of the substrate 102 that are not covered by the first plane electrically conducting portion 302.

A second plane electrically conducting portion 306a and a third plane electrically conducting portion 306b, both corresponding to plane metallic portions, are placed in contact with the dielectric layer 304, each at least partly facing the first plane electrically conducting portion 302, one (306a) of which is electrically connected to the electronic circuit 108 through the electrical connection formed by the conducting via 116 and the first electrically conducting element 118a, and the other (306b) of which is electrically connected to the electronic circuit 108 through the electrical connection formed by another conducting via 308 made through the substrate 102 and the dielectric layer 304, and the second electrically conducting element 118b. Although not visible in FIG. 5, the side walls of the vias 108 and 308 are covered by a dielectric material that avoids electrical contact between the substrate 102 and the electrically conducting materials filling the vias 108 and 308.

Therefore in this third embodiment, the integrity of the back face of the electronic chip 300 is controlled by checking the value of the capacitance of a first plane capacitive element 115a formed by the first plane electrically conducting portion 302, corresponding to the first electrode of this first capacitive element 115a, and the second plane electrically conducting portion 306a corresponding to the second electrode of this first capacitive element 115a, separated from each other by the dielectric layer 304, and checking the value of the capacitance of a second plane capacitive element 115b formed by the first plane electrically conducting portion 302 corresponding to the first electrode of this second capacitive element, and the third plane electrically conducting portion 306b corresponding to the second electrode of this second capacitive element 115b, separated from each other by the dielectric layer 304. A larger number of plane capacitive elements can be made at the back face of the electronic chip 300. Each of the capacitive elements formed at the back face of the electronic chip 300 is connected to the electronic circuit 108 through at least one conducting via that can made a fine mesh of electrical capacitances covering the entire back face of the electronic chip 300. Such protection means enable electrical detection of an attack on one or several capacitive elements on the back face of the chip (by measuring the values of capacitances of these elements as disclosed above for electronic chips 100 and 200) and can also form a screen against electromagnetic attacks.

As a variant, the first portion 302 might be omitted, and the first electrode of the first capacitive element 115a and the first electrode of the second capacitive element 115b that are formed by the substrate 102 may be used as in the first embodiment disclosed above.

In the third embodiment disclosed above, the plane electrically conducting portions 302, 306a and 306b each have an approximately rectangular shaped section in a plane parallel to the front face 104 and the back face 106 of the substrate 102 (parallel to the (X,Y) plane), or more generally they may have solid surfaces. As a variant, the sections of one or several of these electrically conducting portions forming the capacitive elements at the back face of the electronic chip 300 may have different shapes, for example they may be in the form of a network of coils and thus form electrically conducting tracks, which can maximise variations in the value of the electrical capacitance if these capacitances are modified, and therefore have better sensitivity to detection of an attack on the back face of the electronic chip 300.

Figure 6:
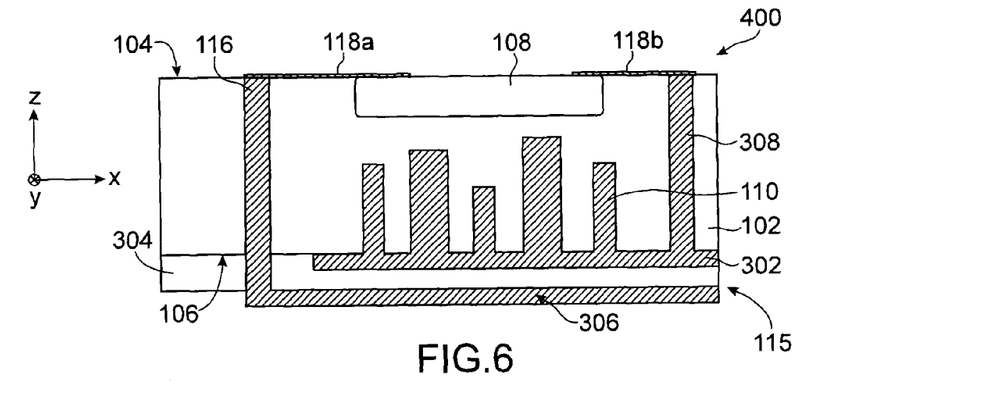
FIG. 6 shows an electronic chip according to a fourth embodiment.

FIG. 6 shows a fourth embodiment of an electronic chip 400.

As in the third embodiment, the means of protection of the back face of the electronic chip 400 are based on a measurement of the electrical capacitance of a capacitive element 115 formed at the back face 106 of the substrate 102, between a first plane electrically conducting portion 302 and a second plane electrically conducting portion 306 separated from each other by the dielectric layer 304. The first plane electrically conducting portion 302 is connected to the vias 110 filled with an electrically conducting material, for example metallic, and the dimensions of which vary from each other and are random. The conducting via 308 in this case connects the plane electrically conducting portion 302 to the second electrically conducting element 118b itself connected to the electronic circuit 108. Thus, apart from the protection obtained by monitoring the variation of the value of the electrical capacitance formed between the electrically conducting portions 302 (coupled to vias 110) and 306, the presence of vias 110 makes it possible to defend against laser beam attacks made on the back face of the electronic chip 400.

Figure 7:
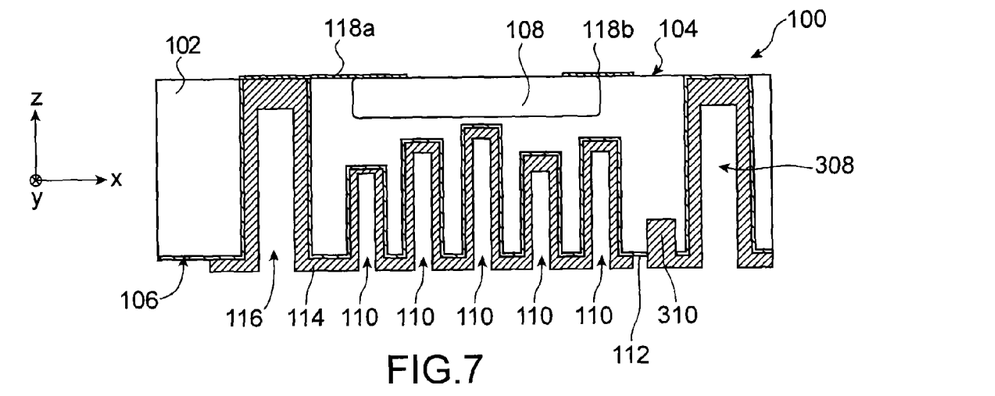
FIG. 7 shows an electronic chip according to a variant of the first embodiment.

FIG. 7 shows a variant of the first embodiment of the electronic chip 100.

Unlike the electronic chip 100 described above with reference to FIG. 1, the second electrical connection electrically connecting the second electrode of the capacitive element 115 (formed by the part of the substrate 102 in contact with the dielectric layer 112 and facing the electrically conducting layer 114) to the electronic circuit 108 that in this case is made by a second via 308 electrically connected to the second electrically conducting element 118b and to a connection zone of the electrical contact 310 located at the back face 106 of the substrate 102 and that is in contact with the part of the substrate 102 forming the second electrode of the capacitive element 115. Such a second electrical connection improves the measurement of the value of the capacitance of the capacitive element 115, particularly when the substrate 102 is semiconductor-based because the transfer of the electrical potential of the second electrode made by this second via 308 is better than is possible with the substrate 102. Furthermore, such a configuration enables any type of electronic circuit 108 to make contact with the substrate, regardless of whether or not the electronic circuit has an electrical contact element on the front face. Finally, such a second electrical connection can also be used when the substrate 102 is not homogeneous, in other words when it is not formed from an electrically conducting or semiconducting material alone, for example in the case of an SOI substrate. This variant can also be applied to chips previously disclosed with reference to FIGS. 3 and 4.

As a variant to the different embodiments disclosed above, it is possible that the cross-sections of the vias 110 in a plane parallel to the front face 104 and the back face 106 of the substrate 102 are arbitrary in shape (rectangular, triangular, etc.), or that these vias 110 are partially or totally replaced by trenches, that may or may not be straight, the side walls and bottom walls of which may or may not be covered by the dielectric layer 112 and the electrically conducting layer 114, or completely filled with an electrically conducting material. In FIGS. 1 to 4 and 6, the references 110 may denote trenches that are seen in a side sectional view in these figures.

The protection of the back face of the electronic chips 100-400 disclosed above is compatible with known protections for the front face of electronic chips (for example active metal screens), and the means of protection of the back face of electronic chips 100-400 disclosed above may be combined with such protection on the front face of electronic chips 100-400.

The invention claimed is:

1. An electronic chip, comprising:
   an electronic circuit located at a front face of a substrate;
   at least one capacitive element placed at least at a back face of the substrate and at least partly facing the electronic circuit, and electrically connected to the electronic circuit by at least one first electrical connection and one second electrical connection,
      the at least one first electrical connection including at least one first electrically conducting via passing through the substrate,
      the electronic circuit being configured to measure a value of electrical capacitance of the at least one capacitive element between the at least one first electrical connection and the second electrical connection; and
   a plurality of second vias or trenches passing through the back face of the substrate and a part of the thickness of the substrate, and extending toward the electronic circuit such that bottom walls of the plurality of second vias or trenches are separated from the electronic circuit by at least one non-zero distance,
   wherein each bottom wall of each via or trench of said plurality is disposed opposite to a lower surface of the electronic circuit, and is arranged in the substrate substantially within a region defined by a lateral width of the electronic circuit.

2. The electronic chip according to claim 1, further comprising:
   a first dielectric layer covering side walls of the first electrically conducting via, side walls and the bottom walls of the plurality of second vias or trenches, and the back face of the substrate, a first continuous electrically conducting layer covering the first dielectric layer on the side walls of the first electrically conducting via, the side walls and the bottom walls of the plurality of second vias or trenches, and at least part of the back face of the substrate, and also covering a bottom wall of the first electrically conducting via, in which the first electrically conducting layer forms a first electrode of the capacitive element and is electrically connected to the electronic circuit through the first electrical connection.

3. The electronic chip according to claim 2, in which part of the substrate placed in contact with the first dielectric layer and facing the first electrically conducting layer forms a second electrode of the capacitive element.

4. The electronic chip according to claim 2, in which the first dielectric layer and the first electrically conducting layer completely fill the volumes formed by at least one of the first electrically conducting via and the plurality of second vias or trenches.

5. The electronic chip according to claim 2, also comprising a second structured electrically conducting layer at the front face of the substrate, forming a coil inductively coupled to at least part of the first electrically conducting layer, the second electrically conducting layer being electrically connected to the electronic circuit and configured to measure a value of an inductance of the coil.

6. The electronic chip according to claim 5, in which said part of the first electrically conducting layer corresponds to a part located at the bottom walls of the plurality of second vias or trenches.

7. The electronic chip according to claim 2, in which the first electrically conducting layer comprises a material which is not transparent to wavelengths between about 100 nm and 10μm.

8. The electronic chip according to claim 1, in which the capacitive element further comprises:
a first plane electrically conducting portion located at the back face of the substrate, forming a first electrode of the capacitive element and electrically connected to the electronic circuit;
a second dielectric layer covering at least the first plane electrically conducting portion;
a second plane electrically conducting portion separated from the first plane electrically conducting portion by the second dielectric layer, forming a second electrode of the capacitive element and being electrically connected to the at least one first electrically conducting via.

9. The electronic chip according to claim 8, further comprising at least one third plane electrically conducting portion separated from the first plane electrically conducting portion by the second dielectric layer and electrically connected to the electronic circuit through at least the third electrically conducting via passing through the substrate, and in which the first plane electrically conducting portion and the third plane electrically conducting portion form a first electrode and a second electrode respectively of a second capacitive element located at the back face of the substrate and at least partly facing the electronic circuit.

10. The electronic chip according to claim 8, in which the first plane electrically conducting portion is in contact with an electrically conducting material that fills at least the plurality of second vias or trenches and is electrically connected to the electronic circuit through at least the third electrically conducting via passing through the substrate.

11. The electronic chip according to claim 8, in which the first plane electrically conducting portion is connected to the electronic circuit through at least a part of the substrate which is electrically conducting or semiconducting.

12. The electronic chip according to claim 1, in which the second electrical connection comprises at least one third electrically conducting via passing through the substrate or comprises at least part of the substrate that is electrically conducting or semiconducting.

13. The electronic chip according to claim 1, in which the distance between the bottom walls of the plurality of second vias or trenches and the electronic circuit is less than or equal to about 20μm.

14. The electronic chip according to claim 1, wherein the plurality of second vias or trenches have different volumes.

15. A method of manufacturing an electronic chip, comprising:
forming an electronic circuit at a front face of a substrate;
fabrication fabricating at least one capacitive element at least one back face of the substrate and at least partly facing the electronic circuit, and at least one first electrical connection and one second electrical connection such that the at least one first electrical connection comprises at least one first electrically conducting via passing through the substrate, and electrically connecting the at least one capacitive element to the electronic circuit, the electronic circuit being configured to measure a value of electrical capacitance of the at least one capacitive element between the at least one first electrical connection and the second electrical connection, and
fabricating a plurality of second vias or trenches passing through the back face of the substrate and part of the thickness of the substrate, and arranged extending toward the electronic circuit such that bottom walls of the plurality of second vias or trenches are at at least one non-zero distance from the electronic circuit,
wherein each bottom wall of each via or trench of said plurality is disposed opposite to a lower surface of the electronic circuit, and is arranged in the substrate substantially within a region defined by a lateral width of the electronic circuit.

16. The method according to claim 15, wherein dimensions of each of the the plurality of second vias or trenches passing through the back face of the substrate and part of the thickness of the substrate are chosen randomly relative to the dimensions of the other second vias or trenches of said plurality.

17. The method according to claim 15, further comprising fabricating at least one third electrically conducting via passing through the substrate and to form at least part of the second electrical connection.

* * * * *